United States Patent [19]

Hiramatsu

[11] Patent Number: 4,492,453

[45] Date of Patent: Jan. 8, 1985

[54] SINGLE LENS REFLEX CAMERA WITH MIRROR OPERATING MECHANISM

[75] Inventor: Akira Hiramatsu, Kanagawa, Japan

[73] Assignee: Canon Kabushiki Kaisha, Tokyo, Japan

[21] Appl. No.: 437,016

[22] Filed: Oct. 27, 1982

[30] Foreign Application Priority Data

Nov. 5, 1981 [JP] Japan ............................ 56-177367
Nov. 5, 1981 [JP] Japan ............................ 56-177368
Dec. 22, 1981 [JP] Japan ...................... 56-191318[U]

[51] Int. Cl.³ .................................................. G03B 7/099
[52] U.S. Cl. ................................................... 354/479
[58] Field of Search ............... 354/23 R, 55, 56, 59, 354/152, 479

[56] References Cited

U.S. PATENT DOCUMENTS

| | | | |
|---|---|---|---|
| 3,468,233 | 9/1969 | Schmidt | 354/55 |
| 4,293,209 | 10/1981 | Kurei | 354/55 |
| 4,311,376 | 1/1982 | Haraguchi | 354/55 |
| 4,320,945 | 3/1982 | Kimura | 354/55 |
| 4,331,402 | 5/1982 | Nihei | 354/59 |
| 4,342,508 | 8/1982 | Haraguchi | 354/55 |
| 4,348,088 | 9/1982 | Yamamichi et al. | |

FOREIGN PATENT DOCUMENTS

56102540 12/1979 Japan .
5685822 12/1979 Japan .

*Primary Examiner*—Russell E. Adams
*Attorney, Agent, or Firm*—Toren, McGeady and Stanger

[57] ABSTRACT

A single lens reflex camera having:
a first mirror including a portion for allowing passage of light therethrough;
a second mirror for receiving the light passing through the first mirror and coupled to the first mirror in rotatable relation thereto;
a drive mechanism for driving the first and second mirrors, the drive mechanism being rotatable about a shaft and connected to the first mirror in rotatable relation thereto at a position offset from the shaft, the drive mechanism having an actuating portion for the second mirror; and
a hindering device for hindering the first mirror from retracting from an optical path when the second mirror is being folded onto the first mirror as the drive mechanism rotates to drive the first and the second mirrors.

8 Claims, 7 Drawing Figures

SINGLE LENS REFLEX CAMERA WITH MIRROR OPERATING MECHANISM

BACKGROUND OF THE INVENTION

1. Field of the Invention

This invention relates to single lens reflex cameras, and more particularly to a camera which is equipped with a main movable mirror for cooperation with a view-finder which has at least a portion of the area thereof capable of passing light therethrough and an auxiliary movable mirror coupled to the main movable mirror in collapsible relation thereto and arranged upon being set in an upright position to reflect the light passed through the main movable mirror to a light sensor, or the like.

2. Description of the Prior Art

In the art of single lens reflex cameras, for example, there have been proposed in the past a wide variety of methods and apparatus for splitting the light passing through a photographic objective lens into parts one of which is conducted to a photosensitive element for focus detection whereby the focus condition of the photographic objective is displayed in the field of the view-finder, or whereby automatic focusing of the photographic objective may be achieved.

Installation of such a photosensitive element for focus detection within the camera body imposes limitations on the optics and/or limitations on the structure of the mirror mechanism since the photosensitive element is often located on the bottom of the mirror box. Therefore, in order to conduct the light passed through the objective lens to the photosensitive element, the view finder main mirror is usually made partially reflective and an auxiliary mirror is positioned behind the main mirror to direct the light passed through the main mirror to the photosensitive element.

However, the use of the auxiliary mirror constituting part of the focus detecting optical system at such a location lying in the optical path to the photographic film necessarily leads to the requirement that in order to initiate an exposure, prior to opening the shutter, both the view-finder main mirror and the auxiliary mirror must be retracted from the photographic light path. Thus, soon after the termination of the exposure, or soon after the shutter is closed, these mirrors must be returned to their initial position. For this purpose, a suitable drive mechanism must also be incorporated into the interior of the camera.

A conventional method for driving this type of arrangement of the main movable mirror and the auxiliary movable mirror, may take, for example, a form such that the main and auxiliary mirrors are simultaneously driven to move. In this form, however, there is a need for a large driving torque in operating both of the movable mirrors. Particularly when the size of the auxiliary mirror is increased, a very strong spring is necessary along with a sufficient reinforcement of each constituent part. This involves a substantial increase in the bulk and size of the camera mechanisms.

The existence of a need for increasing the size of the aforesaid auxiliary mirror will be seen from the fact that in order to improve the accuracy of the focus detecting device, the amount of light taken into the optical system for focus detection tends to increase.

SUMMARY OF THE INVENTION

With the foregoing in mind, the present invention has for its general object to provide a novel single lens reflex camera which avoids the aforementioned drawbacks of the conventional camera.

Another object of the present invention is to provide a device which will reduce the load when the main and auxiliary movable mirrors are being retracted from the photographic light path and, therefore, to provide a single lens reflex camera equipped with a novel mirror drive mechanism capable of performing the retracting operation of both of the mirrors with a light driving force.

Still another object of the present invention is to provide a device which makes it possible to extend the main mirror toward the photographic objective lens by appropriately devising the manner of driving the main mirror, and, therefore, to provide for a single lens reflex camera a novel mirror drive mechanism which can advantageously eliminate the conventional drawbacks so that when observing the finder image prior to making an exposure, the lower margin of the finder frame is darkened due to the lack of light.

Pursuant to these objects, according to a preferred embodiment of the present invention, there is provided a single lens reflex camera equipped with a mirror mechanism comprising a main mirror for the view finder which permits passage of light through at least a portion thereof, an auxiliary mirror rotatable about a shaft connected to said main mirror and performing function of receiving the light passed through said main mirror, a first spring member urging the main mirror in a direction to enter the photographic light path of the camera, a second spring member urging the auxiliary mirror to an extended position relative to said main mirror, and a single drive member for folding the auxiliary mirror on to the main mirror and for retracting said main mirror along with said folded auxiliary mirror from the photographic light path, wherein said drive member has an axis of rotation and is connected to said main mirror at an off-set point from said axis of rotation, and has an actuating portion for the auxiliary mirror.

In the mechanism according to the invention, when the drive member rotates about its axis of rotation, at first, the auxiliary mirror is folded on to the main mirror, and, at this time, the main mirror is pulled obliquely upwards without retracting from the photographic light path. Then, at a point in time when the auxiliary mirror has been folded, the main mirror along with the auxiliary mirror is turned about the axis of rotation of said drive member to retract from the photographic light path.

Thus, when the main mirror and auxiliary mirror are being drive to move, the load is dispersed with time, thereby providing an advantage in that a reduction of the load is achieved so that a light driving force is adequate for the mirror drive. Furthermore, particularly in view of the fact that when the auxiliary mirror is folded on to the main mirror, the main mirror without being retracted from the photographic light path is moved obliquely upwards or in its plane, it occurs that when the main mirror starts to move away from the viewing position, there is formed a large gap between the tip of the main mirror and the rear vertex of the photographic objective lens. Therefore, the main mirror can be correspondingly extended toward the photographic objective side.

It should be noted that in order to allow for the main mirror to move obliquely upwards without having to retract it from the photographic light path when the auxiliary mirror is being folded, a key mechanism may, for example, be provided for maintaining the main mirror in the photographic light path until the auxiliary mirror has been folded. Otherwise the bias force of the spring member urging the main mirror may be made stronger than that of the auxiliary urging spring member to achieve an equivalent function.

Also, with regard to retraction of the main mirror from the photographic light path after the auxiliary mirror has been folded, the drive member may be so arranged that the main mirror is driven to move through the auxiliary mirror, or it may be provided with an actuating portion which acts directly on the main mirror when the auxiliary mirror has been folded.

A further object of the present invention is to provide a single lens reflex camera equipped with a mirror mechanism having an effective counter-measure for dealing with a problem that is inevitable with the use of a main mirror allowing light to pass through at least a portion thereof, or that occurs due to the phenomenon of light leakage into the mirror box as light enters rearwardly from the finder system past the main mirror.

Thus, according to another preferred embodiment of the present invention, there is provided a single lens reflex camera having a mirror mechanism comprising a main mirror for the view finder which permits light to pass through at least a portion thereof, an auxiliary mirror rotatable about one shaft connected to said main mirror and arranged to reflect light passed through said main mirror to a photosensitive element positioned in a mirror box, and a rotatable drive member for folding said auxiliary mirror on to said main mirror and for retracting said main mirror along with the folded auxiliary mirror from the photographic light path, wherein said drive member is provided with a light-shielding member in a portion thereof which, upon setting of the main mirror in the photographic light path, operates to hinder light from entering rearwardly from the finder optical system and from passing through said main mirror to prevent light from being incident on the photosensitive element. Upon retraction of the said main mirror from the photographic light path to the light-shielding member operates shut the light passage through the light permeable portion of said main mirror preferably in cooperation with the auxiliary mirror.

It is to be noted in this case that under the condition where the main mirror lies in the photographic light path, the tip of the light-shielding member is extended so as to reach the bottom of the mirror box, whereby problematic light coming from the photographic objective and passing through the gap between the tip of the main mirror and the bottom surface of the mirror box can be advantageously prevented from entering the photosensitive element.

It should be noted that in this type of structure the main mirror can be driven through the light-shielding member to retract from the photographic light path.

Also, since in the structure disclosed in connection with the foregoing embodiments, the main mirror can be extended toward the photographic lens side, it is possible to minimize the separation or gap between the tip of the main mirror and the mirror box bottom surface when the main mirror is in the photographic light path.

These and other objects and features of the present invention will become apparent from the following detailed description of embodiments thereof taken with reference to the accompanying drawings.

DETAILED DESCRIPTION OF THE PREFERRED EMBODIMENTS

Figure 1:
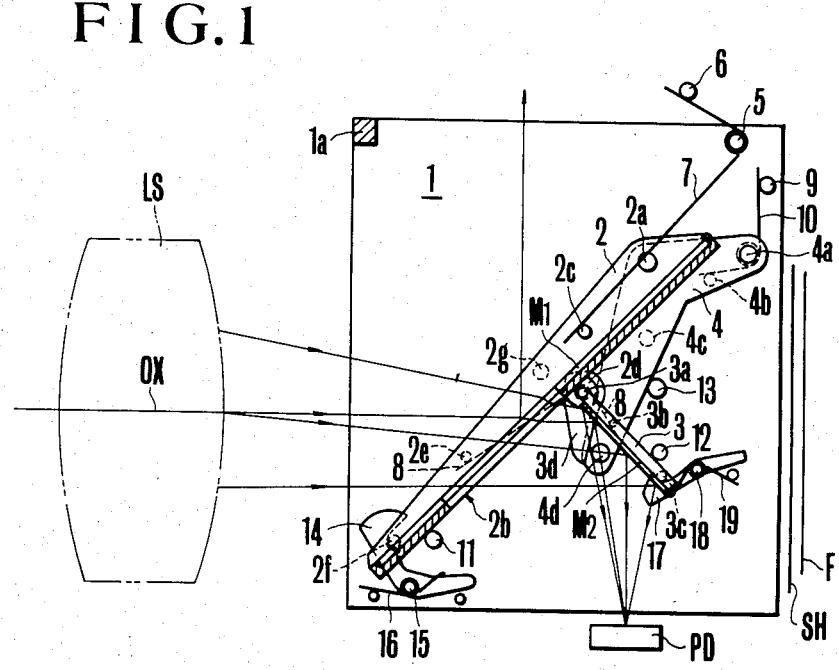
FIGS. 1 to 3 are schematic views illustrating a first embodiment of the present invention with FIG. 1 illustrating the main and auxiliary mirrors returned to their initial positions prior to making an exposure, with FIG. 2 illustrating the auxiliary mirror first folded on to the main mirror and with FIG. 3 illustrating the main and auxiliary mirrors both retracted from the photographic light path when the exposure is being made.
Figure 2:
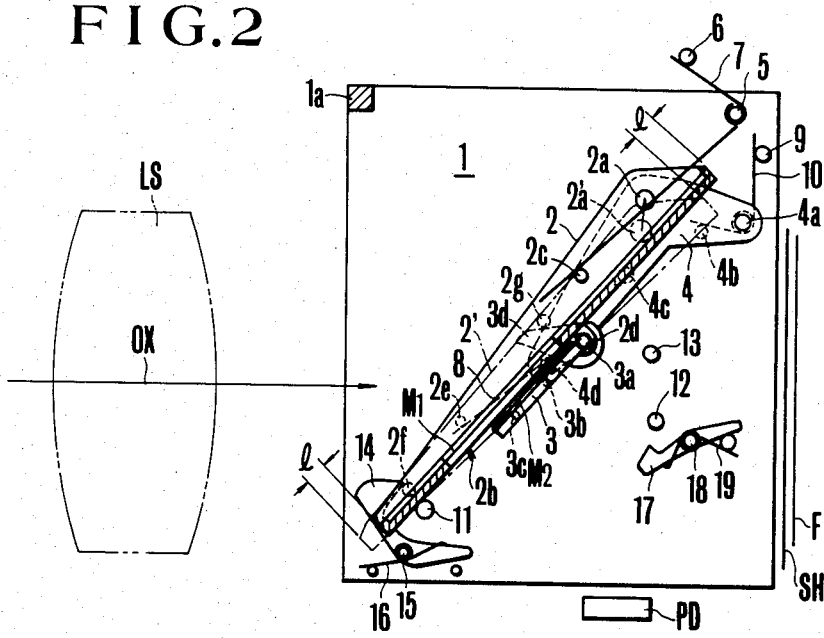
Figure 3:
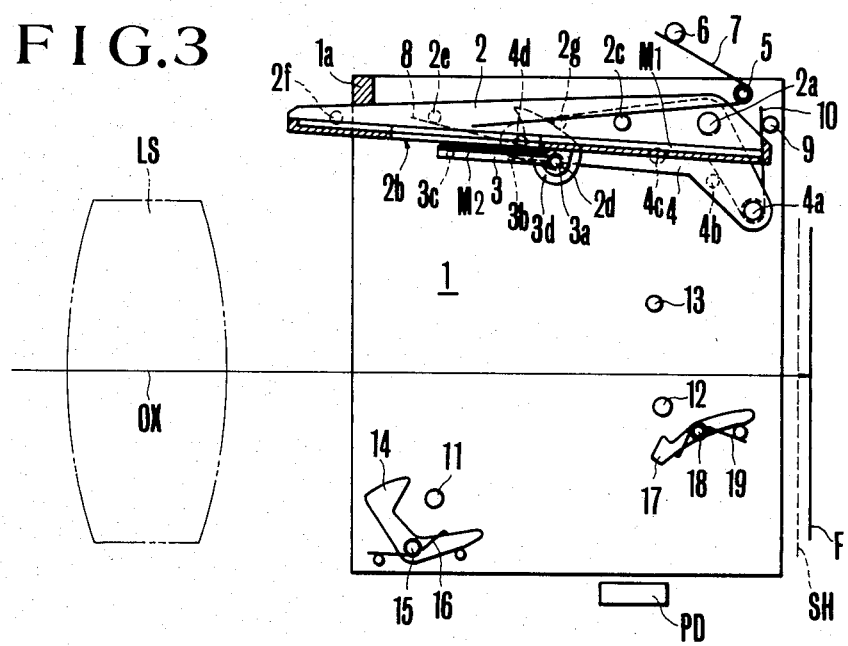

In a first embodiment of the present invention depicted in FIGS. 1 to 3, a single lens reflex camera is provided with side base plates 1 of a mirror box; a main mirror support frame 2 pivotally mounted on a drive lever 4 by a shaft 2a and having a light passage aperture 2b in a portion thereof; a main mirror M1 for a view finder allowing light to pass through at least a portion thereof and supported by the frame 2, the frame 2 being urged to turn in a counterclockwise direction as viewed in the drawings relative to the drive lever 4 by a spring 7 laid against a pin 2c and fixed pins 5 and 6; an auxiliary mirror support frame 3 pivotally mounted on the main mirror support frame 2 by a rotary shaft 3a at eared portions 2d of said main mirror support frame 2; an auxiliary mirror M2 supported by the frame 3, the frame 3 being urged to turn in a counterclockwise direction as viewed in the drawings relative to the main mirror support frame 2 by a spring 8 laid against a pin 3b, a shaft 3a and a pin 2e on the main mirror frame 2; a drive lever 4 pivotally mounted on the base plate 1 by a shaft 4a and urged in a counterclockwise direction by a spring 10 laid against a pin 4b, a shaft 4a and a fixed pin 9; a photosensitive or photoconductive means element PD for focus detection, for example, positioned to receive the light passing through the main mirror M1 and an aperture 2b of the frame 2 and impinging thereon by reflection from the auxiliary mirror M2.

The main mirror frame 2, auxiliary mirror frame 3 and drive lever 4 are ordinarily set stationary in their furthest counterclockwisemost positions as viewed in the drawings in abutting engagement with respective stoppers 11, 12 and 13, as illustrated in FIG. 1, by the respective bias springs 7, 8 and 10. In this state, light coming from a photographic objective lens LS passes through the main mirror M1 and the aperture opening 2b of its frame 2 and is then reflected from the auxiliary mirror M2 to the photosensitive or photoconductive means PD. It is, however, to be noted in this connection that the stoppers 11, 12 and 13 are in the form of eccentric pins or eccentric screws for permitting fine adjustment of each of the limited or rested positions of the main mirror M1, auxiliary mirror M2 and drive lever 4.

Latch levers 14 and 17 are arranged to engage pins 2f and 3c of the mirror frames 2 and 3 respectively when in the position of FIG. 1, and are pivotally mounted on respective pins 15 and 18. Springs 16 and 19 urge the latch levers 14 and 17 in a clockwise direction, or in a direction to engage the pins 2f and 3c.

A significant feature of this embodiment is that the driving force for folding the auxiliary mirror M2 and for flipping the main mirror M1 upwards is time-sequentially dispersed. Moreover, with regard to the main mirror M1, the flipping movement is preceded by an obliquely upward pull. For this purpose, in the structure of this embodiment the auxiliary mirror is dependent form the main mirror M1 through the rotary shaft 3a and is first actuated to be folded so as to lie parallel to the back of the main mirror M1 by the pin 4d mounted on the front end portion of the drive lever. At this time, the main mirror M1 is pulled upward obliquely without undergoing flipping movement to an attitude for enabling actuation of the flipping movement, and then subsequently the main mirror M1 is actuated to move upwards along with the folded auxiliary mirror.

The main mirror M1 and auxiliary mirror M2 in the present embodiment operate such that, at first, a mirror mechanism (not shown) known to those skilled in the art imparts a clockwise driving power as viewed in the drawings to the drive lever 4 about the shaft 4a through its pin 4c. As the drive lever 4 rotates upwards against the spring 10, the pin 4d fixedly mounted on the front end portion of the drive lever 4 abuts on a cam 3d unitarily formed with the auxiliary mirror frame 3 through the rotary shaft 3a and then turns the auxiliary mirror frame 3 about the shaft 3a in the clockwise direction against the spring 8 so that it is folded on the back surface of the main mirror frame 2.

Such rotative movement of the drive lever 4 influences the main mirror frame 2 with the result that the main mirror frame 2 is pulled from the position of FIG. 1 to the position of FIG. 2, as illustrated in FIG. 2 by dot-and-dash lines and solid lines, rightwardly obliquely upward by a substantial distance l without being retracted from the photographic light path. (The dot-and-dash lines represent the position of FIG. 1). Such behavior of the main mirror M1 is induced mainly on the basis of the fact that the rotary shaft 4a of the drive lever 4 and the connection shaft 2a between the main mirror frame 2 and the drive lever 4 are off-set from each other.

Since the auxiliary mirror M2 is folded, when the main mirror M1 is pulled obliquely upward through the distance l, it is at this time that the pin 2f on the main mirror frame 2 disengages from the latch lever 14, whereby the main mirror M1 is made ready to flip upward.

It is to be noted that a timed relationship can be otherwise established independently of the engagement of the latch lever 14 with the main mirror frame 2 by a suitable spring balance between the spring 7 acting on the mirror frame 2 to return the main mirror M1 to the initial position and the spring 8 applied on the auxiliary mirror frame 3 to urge the auxiliary mirror M2 to move away from the main mirror M1. In other words, if the springing force of the spring 7 applied on the main mirror frame 2 is sufficiently strong relative to the spring 8 applied on the auxiliary mirror frame 3, it will result that as rotation of the drive lever 4 proceeds, the auxiliary mirror M2 first starts to turn (of course, at this time, the main mirror M1 is also influenced by the rotation of the drive lever 4), and after the auxiliary mirror M2 has been folded flat on the back surface of the main mirror frame 2, both are then moved upward as a unit.

Now, when the auxiliary mirror M2 has been folded to the back surface of the main mirror frame 2, it is at this time that the cam 3d abuts on the pin 2g of the frame 2. Therefore, from this time onwards, the rotative driving power of the drive lever 4 is transmitted through this connection or engagement of the cam 3d and pin 2g to the main mirror frame 2 so that as the drive lever 4 further turns, the main mirror M1 along with the previously folded auxiliary mirror M2 flips upward so as to be retracted from the photographic light path, thereby finally reaching the position of FIG. 3 where a portion of the frame 2 collides against a buffer member 1a such as sponge provided on the base plate 1 and is stopped.

After the flipping and retracting movement of the mirrors M1 and M2 ends, with the drive lever 4 held in the lifted position of FIG. 3, as is well known, a shutter SH opens to expose a photographic film F to the light from the photographic objective lens LS (In the drawings OX denotes the optical axis of the photographic lens).

The returning operation of the mirrors M1 and M2 to their initial positions after the completion of the exposure occurs after the shutter SH is closed to terminate the exposure, and the drive lever 4 is released from the latching in the position of FIG. 3 in a way known to those skilled in the art. Under the action of the spring 10, the drive lever 4 then starts to move downward, whereby the main mirror M1 and the auxiliary mirror M2 are moved downward as a unit by the bias force of the spring 7 applied on the main mirror frame 2. As illustrated in FIG. 2, the main mirror frame 2 first abuts on the stopper 11 and at this time the latch lever 14 catches the pin 2f under the action of the spring 16. As the drive lever 4 proceeds to turn in the counterclockwise direction, the auxiliary mirror M2 is then moved to be extended from the main mirror M1 by the action of the spring 8 applied on the auxiliary mirror frame 3. Then, at a point in time when the auxiliary mirror frame 3 abuts on the stopper 12, the latch lever 17 catches the pin 3c under the action of the spring 19. After that, the drive lever 4 is further slightly turned in the counterclockwise direction to abut on the stopper 13 and is then stopped. Thus, the initial position of FIG. 1 is regained.

In the structure of this embodiment, the main mirror and the auxiliary mirror are successively driven to move in time-displaced relation by using the drive lever either upwardly or downwardly, thereby providing an advantage in that the load for the mirror drive can be dispersed and reduced to permit for example, a relatively weak spring to be used as the drive power source. In addition to this, the shock at the time of mirror action can be reduced. Moreover, as has been described in connection with FIG. 2, the retreat of the main mirror M1 through the length l permits the total length of the main mirror M1 to be extended toward the photographic lens LS by at least that distance with the advantage that the darkening of the lower portion of the finder frame due to lack of light can be eliminated.

Figure 4:
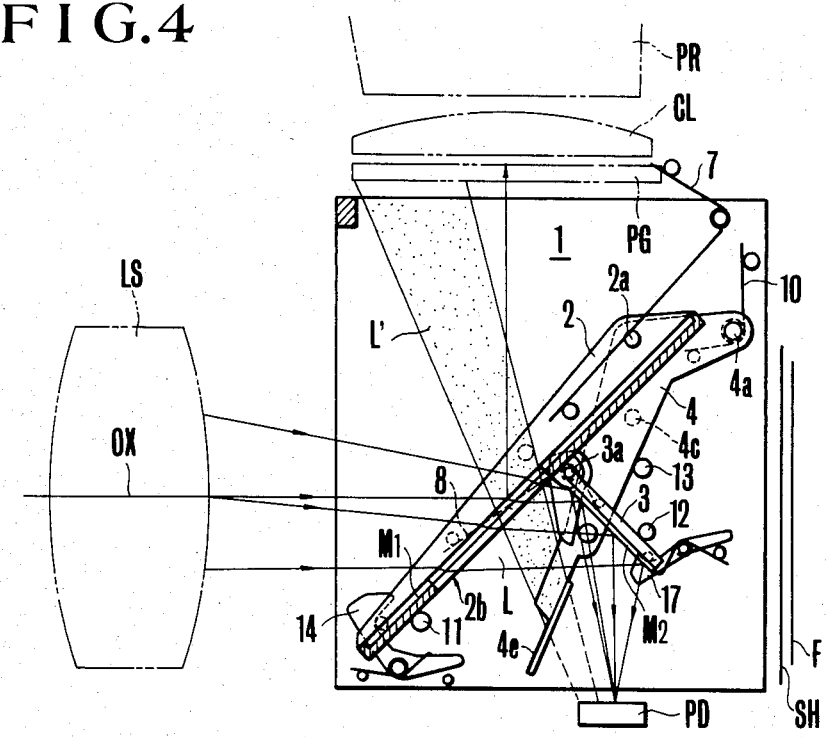
FIGS. 4 to 6 are schematic views illustrating a second embodiment of the present invention in similar operative positions as those shown in FIGS. 1 to 3.
Figure 5:
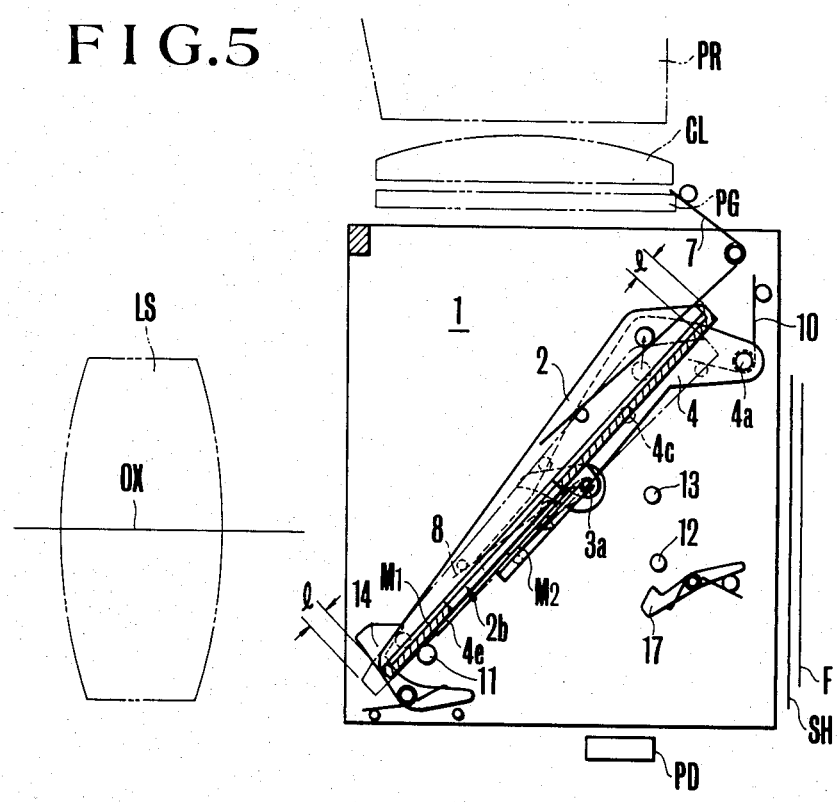
Figure 6:
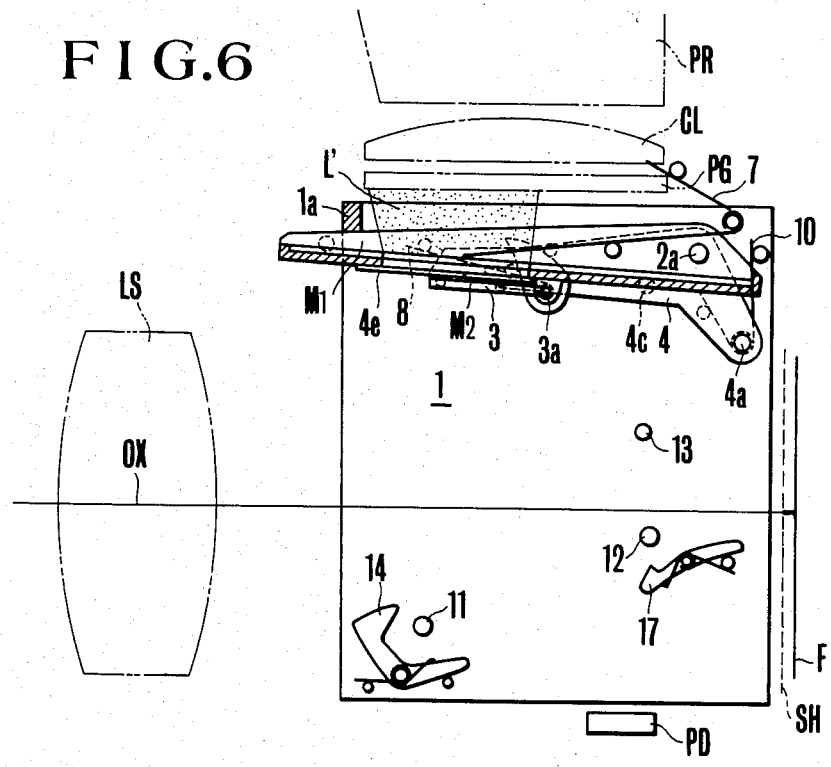

Referring next to FIGS. 4 and 6, a second embodiment of the present invention will be described. This or second embodiment is derived from the first embodiment and adds thereto a countermeasure for dealing with the problem of light coming rearwardly from the finder optical system and leaking through the main mirror M1 and the aperture opening 2b of the main mirror frame 2. All the parts of FIGS. 4 to 6 except those mentioned below are exactly the same in construction and arrangement as those shown in FIGS. 1 to 3.

That is, in the second embodiment, as illustrated in the drawings, the free end of the drive lever 4 is extended, and on the extended portion there is provided a light-shielding plate 4e. The light-shielding plate 4e when in the viewing position of FIG. 4, as illustrated in the drawing, blocks harmful light L' entering rearwardly from the finder optical system (PR, CL, PG, where PR is the penta prism; CL is the collector lens; and PG is the focusing screen) and passing through the main mirror M1 and the aperture opening 2b of the main mirror frame 2 to the photosensitive or photoconductive means PD just in front of said photosensitive means PD. Also when in the exposing position of FIG. 6, the light shielding plate 4e cooperates with the auxiliary mirror M2 to effectively shut the aperture 2b of the main mirror frame 2. It is to be noted in connection with FIG. 4 that the light-shielding plate 4e is so dimensioned that no adverse influence is imparted to the useful light beam L for focus detection coming from the photographic lens LS and passing through the main mirror M1 and the aperture opening 2b of the main mirror frame 2 and going to the auxiliary mirror M2.

Except for the difference discussed above, the embodiment of FIGS. 4–6 is exactly the same in construction and arrangement as that of the first embodiment. According to a feature of this second embodiment, however, during focus-detecting (or light metering) prior to the making of an exposure, the backward light from the finder optical system (PR, CL, PG) can be effectively prevented from entering the photosensitive or photoconductive means PD so that sufficient accuracy of detection can be assured and faulty operation can be prevented from occurring. Also when making an exposure, the back-reflected light from the finder optical system can be effectively prevented from entering the mirror box so that the film F is exposed only to the light from the photographic lens LS and therefore good photographs can always be achieved.

Figure 7:
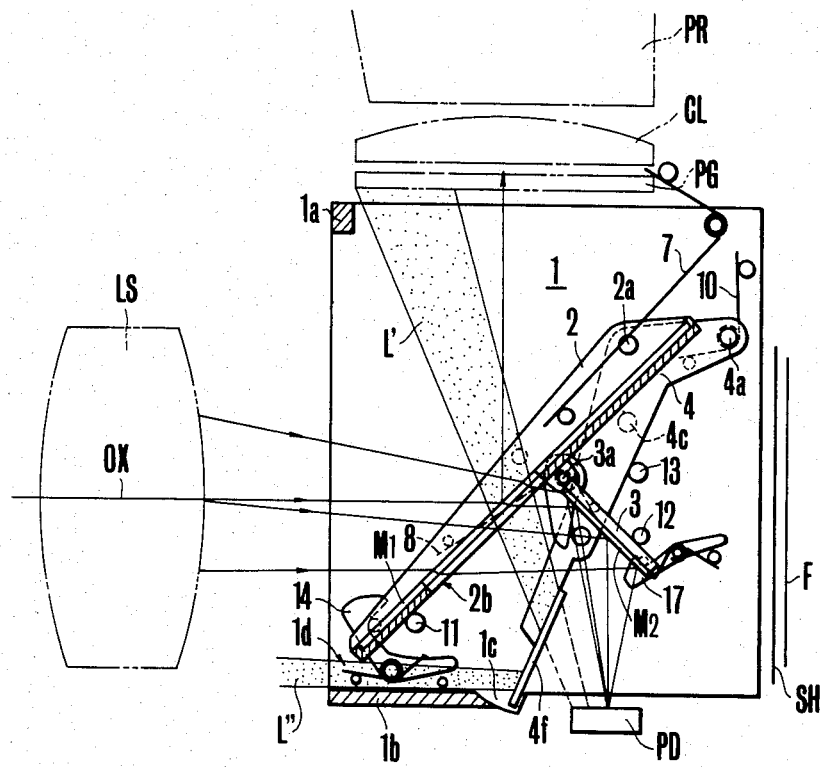
FIG. 7 is a schematic view illustrating a third embodiment of the present invention with the main and auxiliary mirrors returned to the initial positions prior to the making of an exposure.

A third embodiment of the present invention depicted in FIG. 7 is improved as compared with the second embodiment by providing a counter-measure to deal with the problem of other harmful light leaking through the gap between the front end portion of the main mirror frame 2 and the bottom surface of the mirror box.

That is, in FIG. 7, a light-shielding plate 4f provided on the free end extended portion of the drive lever 4 is in a further extended form as compared with the light-shielding plate 4e in FIGS. 4 to 6 so that when the mirrors are in the initial positions before exposure, as illustrated in the drawing, its end is snugly fitted in a recessed portion 1c formed in a portion of the bottom wall of the mirror box. In this state, therefore, harmful light L" leaking through the gap 1d between the main mirror frame 2 and the bottom wall 1c of the mirror box is blocked just in front of the photosensitive or photoconductive means PD.

Although in this third embodiment, parts other than those described above are the same in construction and arrangement as those in the second embodiment, according to the feature of this third embodiment, when focus detecting (light metering or the like) is being performed before exposure, not only the rearward light leak L' from the finder optical system (PR, CL, PG) but also the light leak L" from the gap between the tip of the main mirror frame 2 and the bottom surface of the mirror box can be effectively prevented from being incident upon the photosensitive or photoconductive means PD with the advantage that the accuracy of detection can be further improved.

It is to be noted that in the structure of the second and third embodiments, that part of the upward drive of the main mirror M1 which occurs after the auxiliary mirror M2 has been folded on to the main mirror M1 can be directly accomplished through the light-shielding plate 4e, 4f (that is, not through the cam 3d). Furthermore even in the structure of the first embodiment, for example, a portion of the drive lever 4 may be made engageable with the pin 2g on the main mirror frame 2 so that similarly a direct upward drive of the main mirror M1 (that is, not through the cam 3d) can be done.

While specific embodiments of the invention have been shown and described in detail to illustrate the application of the inventive principles, it will be understood that the invention may be embodied otherwise without departing from such principles.

What I claim:

1. A single lens reflex camera comprising:
   (a) a photographic lens system defining a photographic optical path;
   (b) first mirror means constituting part of a viewfinder and having a light-permeable portion;
   (c) second mirror means for receiving light passed through said light-permeable portion of said first mirror means, said second mirror means being connected to said first mirror means in pivoting relation thereto;
   (d) a driving lever including an actuating portion for turning said first mirror means and said second mirror means into and from an at-rest position in said optical path;
   (e) cam means engaging with said actuating portion of said driving lever, said cam means being arranged so that said second mirror means can fold on said first mirror means;
   (f) first bias means for allowing said first mirror means to stay in said optical path against the force of said driving lever; and
   (g) second bias means having a weaker bias force than that of said first bias means for allowing said second mirror means to stay against the force of said driving lever in a position where light passed through said light-permeable portion of said first mirror means is received.

2. A single lens reflex camera comprising:
   (a) a photographic lens system defining a photographic optical path;
   (b) first mirror means constituting part of a viewfinder movable between an observing position in said optical path and a retracted position out of said optical path, and having a light-permeable portion;
   (c) light receiving means for receiving light passed through said light-permeable portion of said first mirror means;
   (d) second mirror means for reflecting the light passed through said light-permeable portion of said first mirror means to said light receiving means;
   (e) first drive means for moving said first mirror means and said second mirror means to said observing position; and
   (f) second drive means for placing said second mirror means to an erect position on said first mirror means when said first and second mirror means are moved by said first drive means to said observing position, and for folding said second mirror means over said first mirror means when said first and said second mirror means are moved to said retracted position, said second drive means comprising:

cam means for placing said second mirror means to said erect position on said first mirror means in response to movement of said first drive means when said first mirror means and said second mirror means are moved by said first drive means to said observing position, said cam means being configured such that when said first and said second mirror means are moved from said observing position to said retracted position by said first drive means, said second mirror means is first folded to said first mirror means and said first mirror means is then moved to said retracted position as said drive means moves.

3. A single lens reflex camera comprising:
(a) a photographic lens system defining a photographic optical path;
(b) first mirror means constituting part of a viewfinder movable between a viewing position within said optical path and a non-viewing position out of said optical path, and having a light-permeable portion;
(c) light receiving means for receiving light passing through said light-permeable portion of said first mirror means;
(d) second mirror means for reflecting the light passed through said light-permeable portion of said first mirror means to said light receiving means;
(e) first bias means for maintaining said first mirror means in said optical path;
(f) second bias means exerting a weaker force than that of said first bias means for maintaining said second mirror means in said optical path; and
(g) drive means for moving said first mirror means and said second mirror means to said non-viewing position out of said optical path, including:
  (A) a drive lever for moving said first mirror means; and
  (B) a cam mechanism provided in said drive lever to move said second mirror means, whereby because of the difference between the forces of said first and said second bias means, after said second mirror means has been moved, said first mirror means is moved.

4. A single lens reflex camera according to claim 3 wherein
(A) said first bias means comprises:
  (a) a latching member for latching said first mirror means; and
  (b) a first spring for holding said latching means in a position to latch said first mirror means; and wherein
(B) said second bias means comprises:
  (a) latching means for latching said mirror means; and
  (b) a second spring having a weaker bias force than that of said first spring for holding said latch means in a position to latch said second mirror means.

5. A single lens reflex camera comprising:
(a) first mirror means for view finding, said first mirror means having a portion for allowing passage of light therethrough;
(b) second mirror means for receiving the light passing through said light-passage-allowing portion of said first mirror means;
(c) a photographic lens system defining a photographic optical path;
(d) light receiving means for receiving light entering through said photographic lens, emerging from said light passage allowing portion of said first mirror means and reflected by said second mirror means; and
(e) a light shielding member for blocking light leaking through clearance between the bottom of said first mirror means and the body of said camera and the light straying from said light passage allowing portion of said first mirror means without being reflected by said second mirror means.

6. A single lens reflex camera according to claim 5 further comprising:
(A) means for operatively connecting said light shielding member with said second mirror means.

7. A single lens reflex camera according to claim 6 wherein said operatively connecting means includes:
(A) a lever for driving said first mirror means;
(B) a drive connection member between said lever and said light shielding member operating in such a manner that when said first mirror means is driven to move into said optical path and stops, said light shielding member is moved to a position where light leaking from clearance between the bottom of said first mirror means and the body of said camera, and light coming from said light passage allowing portion of said first mirror means without recourse to said second mirror means are shut out.

8. A single lens reflex camera according to claim 7 wherein when said first mirror means and said second mirror means are retracted from said optical path, said drive connection member moves said light shielding member to a position where at least part of the light passage allowing portion of said first mirror means is shut off.

* * * * *